United States Patent
Kihara et al.

(10) Patent No.: US 7,762,730 B2
(45) Date of Patent: Jul. 27, 2010

(54) BI-DIRECTIONAL OPTICAL MODULE AND A METHOD FOR ASSEMBLING THE SAME

(75) Inventors: Toshiaki Kihara, Yokohama (JP); Hiromi Nakanishi, Yokohama (JP)

(73) Assignee: Sumitomo Electric Industries, Ltd., Osaka-Shi (JP)

( * ) Notice: Subject to any disclaimer, the term of this patent is extended or adjusted under 35 U.S.C. 154(b) by 0 days.

(21) Appl. No.: 12/419,522

(22) Filed: Apr. 7, 2009

(65) Prior Publication Data

US 2009/0252461 A1    Oct. 8, 2009

Related U.S. Application Data

(60) Provisional application No. 61/071,002, filed on Apr. 8, 2008.

(30) Foreign Application Priority Data

Aug. 29, 2008    (JP) .............................. 2008-222012

(51) Int. Cl.
*G02B 6/42*    (2006.01)
*G02B 6/36*    (2006.01)
(52) U.S. Cl. .............................. 385/92; 385/88; 385/94
(58) Field of Classification Search ........................ None
See application file for complete search history.

(56) References Cited

U.S. PATENT DOCUMENTS

| | | | | |
|---|---|---|---|---|
| 5,127,075 A * | 6/1992 | Althaus et al. | ................. | 385/94 |
| 5,552,918 A * | 9/1996 | Krug et al. | .................. | 398/139 |
| 5,867,622 A * | 2/1999 | Miyasaka et al. | ............. | 385/88 |
| 6,040,934 A * | 3/2000 | Ogusu et al. | ................. | 398/139 |
| 7,364,373 B2 | 4/2008 | Ishikawa | | |
| 2004/0218857 A1* | 11/2004 | Hung | ........................... | 385/31 |
| 2006/0039657 A1* | 2/2006 | Okada et al. | .................. | 385/89 |
| 2007/0237465 A1* | 10/2007 | Okada | .......................... | 385/92 |
| 2010/0086262 A1 | 4/2010 | Kihara et al. | | |

FOREIGN PATENT DOCUMENTS

| JP | 62-229206 | 10/1987 |
|---|---|---|
| JP | 2003-279808 | 10/2003 |
| JP | 2004-012844 | 1/2004 |

* cited by examiner

*Primary Examiner*—Michelle R Connelly Cushwa
(74) *Attorney, Agent, or Firm*—Venable LLP; Michael A. Sartori; Steven J. Schwarz

(57) ABSTRACT

A bi-directional optical subassembly (BOSA) is disclosed. The BOSA of the present invention provides first and second optical devices, a WDM filter and the body that is configured to secure two optical devices and to install the WDM filter. The body has a cylindrical shape with a large bore, a small bore and a joint bore connecting two bores. The WDM filter is attached to the tapered surface of the joint bore.

16 Claims, 17 Drawing Sheets

Overlapped length of the WDM filter
with the tapered surface [mm]

BI-DIRECTIONAL OPTICAL MODULE AND A METHOD FOR ASSEMBLING THE SAME

CROSS REFERENCE OF RELATED APPLICATION

This application claims the benefit of U.S. Provisional Application No. 61/071,002, filed on Apr. 8, 2008, and entitled "Bi-directional Optical Module and a method to manufacture the same", which is hereby incorporated by reference.

BACKGROUND OF THE INVENTION

1. Field of the Invention

The present invention relates to an optical subassembly, in particular, the invention relates to an arrangement of a bi-directional optical subassembly that provides functions of an optical transmitting and an optical receiving for the single optical fiber.

2. Related Prior Art

The bi-directional optical sub-assembly has been well known in the filed of the optical communication system. The BOSA has a function of the optical transmitting for a wavelength of 1.31 μm and a function of the optical receiving for a wavelength of 1.48 μm or 1.55 μm, which is called as the bi-direction optical module (BOSA).

FIG. 1A schematically illustrates one type of the BOSA disclosed in the United States patent application published as US 20060039657A. The BOSA shown in FIG. 1A is implemented with a light transmitting device 110, a light receiving device 120 and a wavelength division multiplexing (hereafter denoted as WDM) unit 130. The light transmitting device 110 installs a semiconductor laser diode (hereafter denoted as LD); while, the light receiving device 120 installs a semiconductor photodiode (hereafter denoted as PD). These devices, 110 and 120, are assembled with the WDM unit 130 with a co-axial shape. On an end of the WDM unit 130 is provided with a sleeve that receives an external optical connector, or, when this BOSA 100 is to be coupled with external equipments via a pig-tail coupling, a pig-tail unit 140.

The WDM unit 130 encloses a WDM filter 132 and a cut filter 134. The light emitted from the light transmitting device 110 couples with the optical fiber within the pig-tail unit 140 after it is concentrated by a lens set on the top of the light transmitting device 110 and passes through the WDM filter 132. While, the light provided from the optical fiber in the pig-tail unit 140 transmits to the light receiving device 120 set in a side of the WDM unit 300 after it is reflected by the WDM filter 132. Although FIG. 1A does not explicitly illustrate another lens set on the top of the light receiving device 120, the received light provided from the pig-tail unit 140 is concentrated on the PD in the light receiving device 120 by this lens.

FIG. 1B is a perspective drawing, which is partially broken to illustrate an inside of the WDM unit 130. As mentioned above, the WDM unit 130 has the co-axial shape with an opening 130a in one end thereof to receive the light transmitting device 110, while, one side thereof attaches the light receiving device 120. One side 130b of the WDM unit 130 opposite to the side where the light transmitting module 110 is set thereon is formed in flat to set the pig-tail unit 140 thereon. The opening 130a provides three bores, 130c to 130e, through which the light emitted from the light transmitting device 110 passes to heads for the WDM filter 132.

The opposite side of the three bores, 130c to 130e, forms a slope 130f to mount the WDM filter 132 thereon. That is, the slope 130f constitutes one of side surfaces not formed in an interior surface constituting the bores, 130c to 130e. FIG. 1A shows this slope 130f viewed from the outside of the WDM unit 130. The slope 130f is necessary to make an angle 45° to an axis connecting the optical axis of the fiber in the pig-tail unit 140 with the axis of the light transmitting device 110 to couple the light from the light transmitting device 110 with the optical fiber and, at the same time, to couple the light from the optical fiber with the light receiving device 120.

When the WDM filter 132 is a type of the multi-layered dielectric film, the transmittance and the reflectance of the WDM filter 132 depends on the incident angle of the light. In the BOSA 100 shown in FIGS. 1A and 1B, the WDM filter 132 must transmit the light with the wavelength of 1.31 μm in roughly 100%, while, it must reflect the light with wavelengths of 1.48 to 1.55 μm also in roughly 100%. Accordingly, the angle between the optical axis of the WDM filter 132 and that of the light (the incoming light or the outgoing light) must be severely adjusted.

The BOSA 100 shown in FIGS. 1A and 1B provides the slope 130f, where the WDM filter 132 is to be mounted, processed by, for instance, the milling machine. Specifically, setting the WDM unit 130 in the machine such that the axis thereof is inclined by 45° with respect to the axis of the milling drill, the slope 130f is processed in flat. Thus, the conventional BOSA 100 is necessary to process the structure to mount the WDM filter 132 from the outside by using special tools.

SUMMARY OF THE INVENTION

One aspect of the present invention relates to an arrangement of an optical module that comprises first and second optical devices and a body. The first optical device processes first light with the first wavelength, while, the second optical device processes second light with the second wavelength. The body secures the first and second optical devices and installs a WDM filter that transmits the light with the first wavelength but reflects the light with the second wavelength. Thus, the optical module of the present invention configures a bi-directional optical module optically couples with a single optical fiber. A feature of the present bi-directional optical module is that the body includes a bore with a tapered surface where the WDM filter is secured thereat.

The bore may provide large and small bores, and a joint bore connecting these large and small bores. The joint bore provides the tapered surface. These bores may be co-axially formed and have a common axis. The WDM filter may be fixed to the tapered surface of the bore in a condition that only four points including a pair of corners come in directly contact with the tapered surface to leave a gap in a center portion of the WDM filter. The body may further provide an opening through which the first and second optical devices; and the WDM filter may be optically coupled with the single optical fiber. In the present bi-directional module, the center of this opening may be offset from the common axis of the bores.

An arrangement of the present bi-directional module is similarly applicable to a tri-plexer optical module. That is, in the tri-plexer optical module, the first optical device installs both the LD and the PD, while, the second optical device is implemented with the second PD. The WDM filter may transmit light with the first wavelength for the LD and the second wavelength for the PD, while, may reflect light with the third wavelength for the second PD in the second optical device. In the tri-plexer optical module of the present invention, the WDM filter may be similarly fixed to the tapered surface of the bore formed in the body of the module.

Another aspect of the present invention relates to a method to assemble the WDM filter with the body, in particular, the invention relates to the method how to fix the WDM filter to the inner surface of the bore. The method of the invention comprises steps of: (a) processing a bore and an opening in the body by drilling to form the tapered surface, wherein the opening is connected with the bore to transmit the light, (b) preparing an assembling tool that provides a pillar with a slant surface in a top portion thereof, (c) setting the WDM filter on the slant surface, wherein the WDM filter is applied with an adhesive, (d) putting the body over the assembling tool such that the bore of the body receives the pillar, (e) aligning the body with the assembling tool, and (f) gluing the WDM filter on the tapered inner surface of the bore.

The step (e) for aligning the body with the assembling tool includes steps of a rotational alignment and a translational alignment of the body with respect to the assembling tool that sets the WDM filter thereon. The adhesive applied on the surface of the WDM filter may be a type of ultraviolet curable resin and the step (f) of gluing the WDM filter with the tapered surface may be carried out by irradiation the ultraviolet ray from the opening. When the body provides a plane side surface whose normal line extends along the lateral direction of the WDM filter and the assembling tool provides a block with a plane side surface, the rotational alignment of the body may be carried out by abutting the side surface of the body against the side surface of the block of the assembling tool, and the translational alignment may be carried out by sliding the body as the plane surface of the body abuts against the plane surface of the body.

These and other exemplary embodiments, features, aspects, and advantages of the present invention will be described and become apparent from the following detailed description of exemplary embodiments, which is to be read in connection with the accompanying drawings.

DESCRIPTION OF PREFERRED EMBODIMENTS

Next, preferred embodiments of the present invention will be described as referring to accompanying drawings. In the description of the drawings, the same numerals or the same symbols will refer to the same elements without overlapping explanations.

Figure 2:
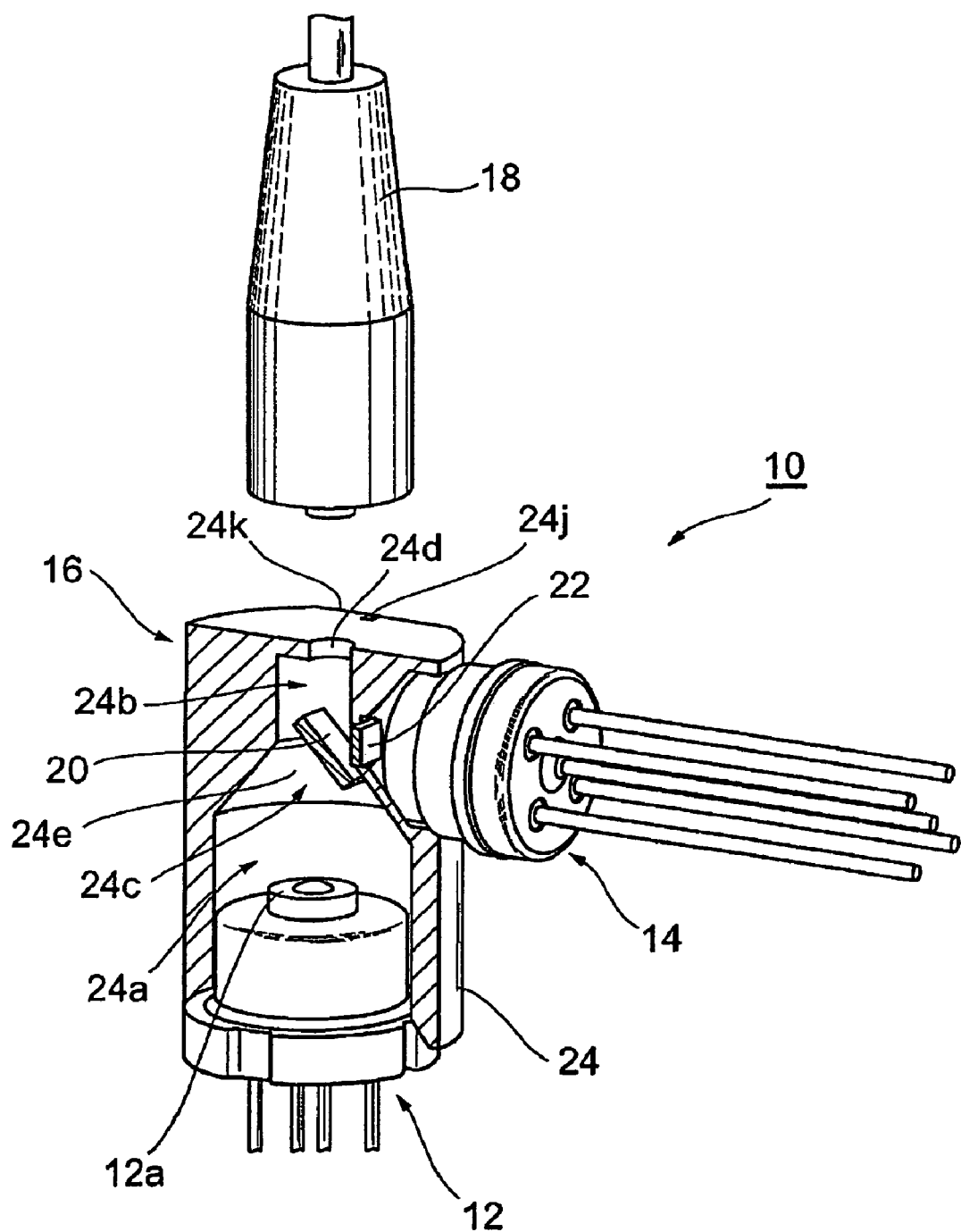
FIG. 2 is a perspective view of the BOSA according to an embodiment of the invention, which is partially broken to show an inside of the BOSA.

FIG. 2 is a partially broken view of a bi-directional optical sub-assembly (hereafter denoted as BOSA) according to an embodiment of the present invention. The BOSA 10 comprises a first optical device 12, a second optical device 14, a wavelength division multiplexer (hereafter denoted as WDM) unit 16 and the pig-tail unit 18. The first optical device 12 may be a transmitter optical sub-assembly (hereafter denoted as TOSA) implemented with a semiconductor laser diode (hereafter denoted as LD) to emit light with a first wavelength λ1 of 1.31 μm.

The second optical device 14 may be a receiver optical sub-assembly (hereafter denoted as ROSA) to receive light emitted from the pig-tail unit 18 with a second wavelength of 1.48 or 1.55 μm. Although the embodiment shown in FIG. 2 provides the TOSA 12 and the ROSA 14, the BOSA 10 may install additional optical sub-assemblies, or the BOSA 10 may have a modified arrangement where the first optical device 12 is a BOSA with an LD and a PD therein to transmit or to receive light with wavelengths of 1.3 μm and 1.48 μm, respectively, while the second optical device is a ROSA to receive light with a wavelength of 1.55 μm. This type of optical modules is called as a tri-plexer.

The BOSA 10 installs the TOSA 12 and the ROSA 14 in the WDM unit 16 such that the ROSA 14 positions in a direction substantially perpendicular to an axis connecting the TOSA 12 with the optical fiber in the pig-tail unit 18. Within the WDM unit 16 is assembled with the WDM filter 20 and another filter 22. The WDM filter 20 transmits the light with the first wavelength λ1 but reflects the light with the second wavelength λ2, while, the cut filter 22 transmits the light with the second wavelength λ2 but reflects the light with the first wavelength λ1. In a case where the BOSA 10 is a tri-plexer, the WDM filter 20 transmits the light with the first wavelength and also the light with the second wavelength but reflects the light with the third wavelength λ3 of 1.55 μm, while, the cut filter 22 transmits the light with the third wavelength λ3 but cuts the light with the first and second wavelengths.

Figure 1B:
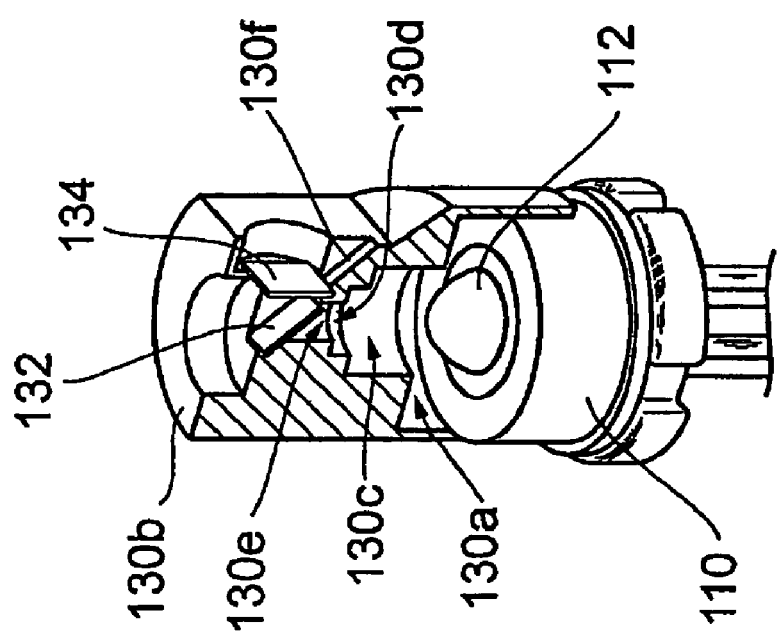
FIG. 1B shows the inside of the conventional BOSA shown in FIG. 1A.
Figure 1A:
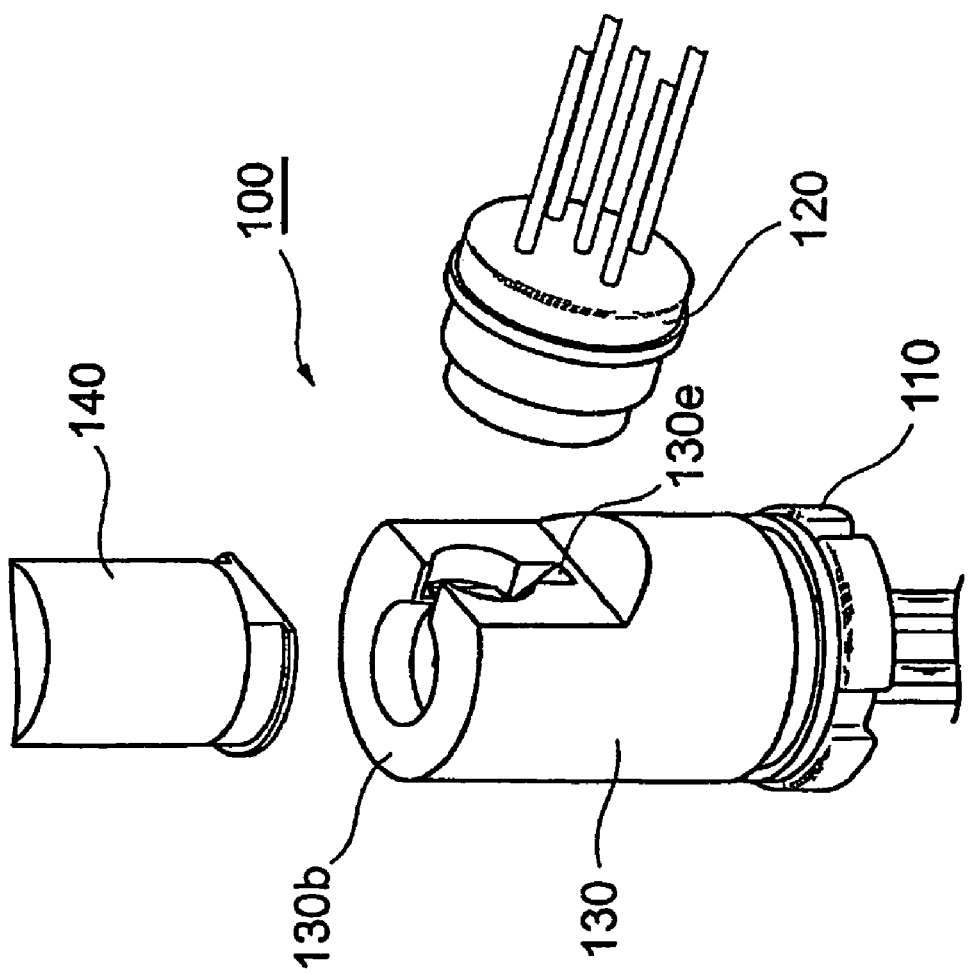
FIG. 1A is a perspective view of the conventional BOSA that externally installs the WDM filter on the slant surface.

One of features of the BOSA 10 different from those of the conventional BOSA is a mechanism to set the WDM filter 20 in the WDM unit 16. The conventional BOSA shown in FIG. 1 has the slope 306 as the mounting structure for the WDM Filter by processing the WDM unit 300 externally. On the other hand, the BOSA 10 shown in FIG. 2 has a structure where it provides the mechanism to mount the WDM filter 20 within the WDM unit 16.

Figure 3:
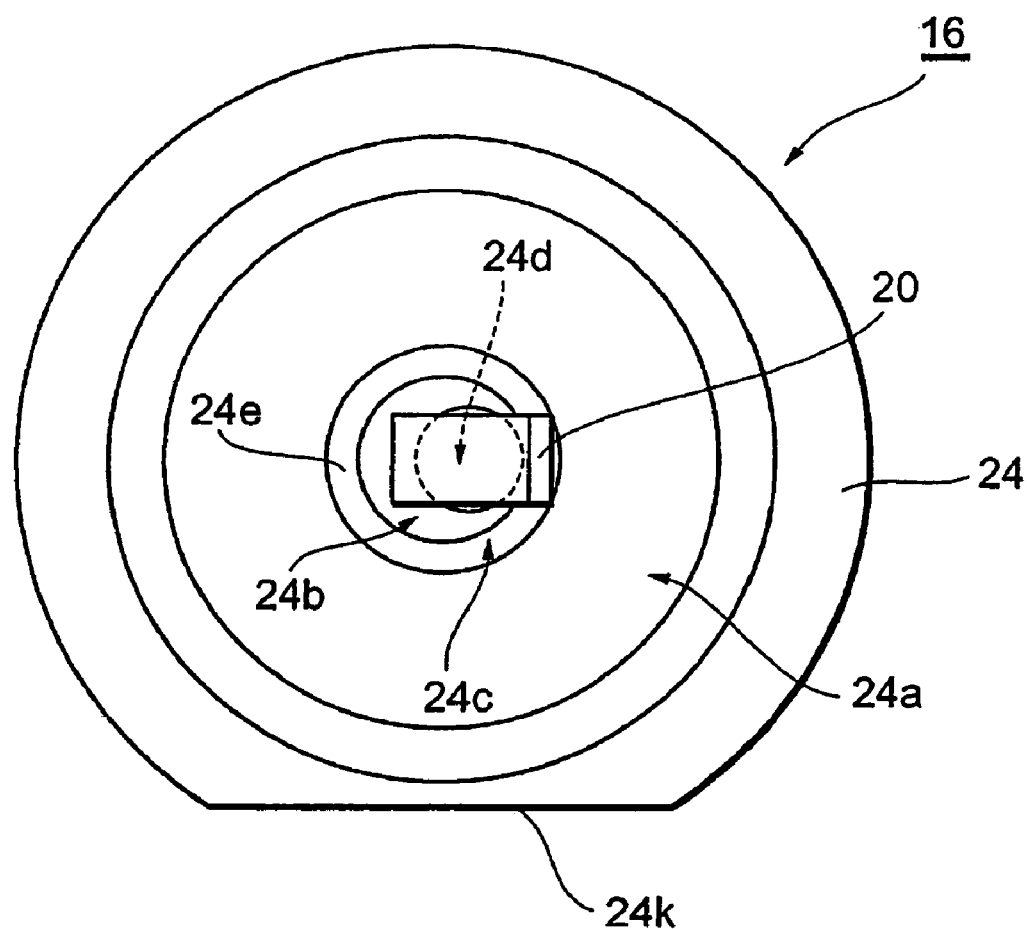
FIG. 3 is a plan view of the WDM unit viewed from the bottom thereof.
Figure 4:
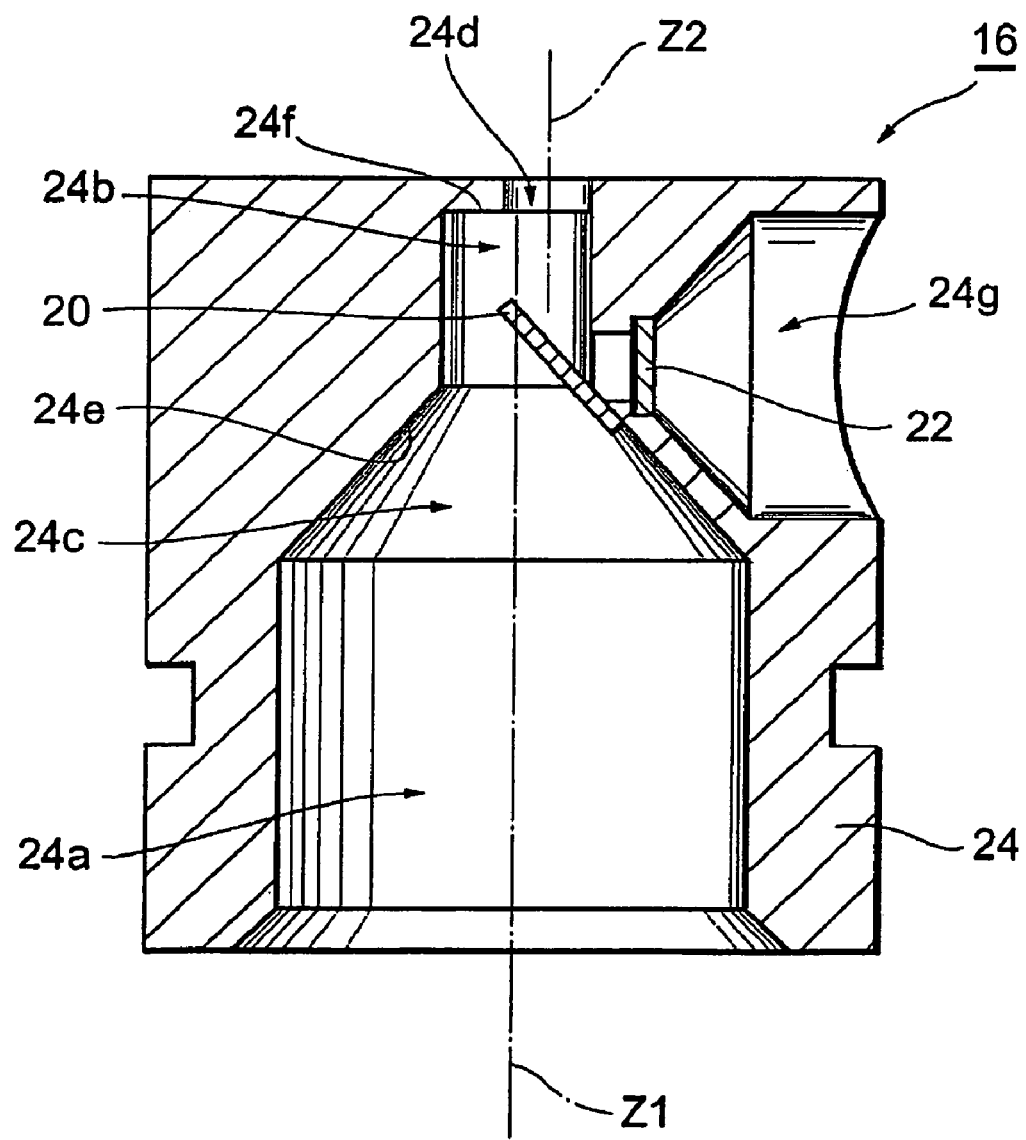
FIG. 4 is a side cross section of the WDM unit with the WDM filter therein.

FIGS. 3 and 4 are views magnifying the structure to set the WDM filter 20. The WDM unit 16 provides a body 24 to set the WDM filter 20 and the cut filter 22. The body 24, that has a cylindrical shape, provides a large bore 24a, a small bore 24b whose diameter is smaller than a diameter of the large bore 24a, a joint bore 24c connecting these two bores, 24a and 24b, and an opening 24d to pass the light. The large bore 24a, the small bore 24b and the connecting bore 24c are aligned coaxially with an axis Z1.

The large bore 24a, provided in one side of the body 24, receives the TOSA 12. Because the large bore 24a has a larger diameter than that of the small bore 24c, the joint bore 24c has a tapered inner surface 24e connecting two bores, 24a and 24b. The WDM filter 20 is attached to this tapered surface 24e and an edge thereof extends into the small bore 24b.

The large bore 24a, the small bore 24b and the joint bore 24c are drilled from an end of the body 24. That is, the small bore 24b is formed first with a first drill whose diameter is substantially equal to the diameter of the small bore 24b, and the large bore 24a is secondly drilled with another drill whose diameter is substantially equal to the diameter of the large bore 24a as utilizing the small bore 24b as a guide hole. The second drilling to form the large bore 24a is halfway stopped, not fully passing the body 24 of the WDM unit 16. The accuracy to stop the second drilling for the large bore 24a may be comparable to the accuracy of the drilling itself, but, a cone angle of the tip end of the second drill is necessary to be a preset value.

The two step drilling described above may form the large bore 24a, the small bore 24b and the joint bore 24c. The taper angle of the joint bore 24c, that is, an angle of the tapered slope 24c with respect to the axis Z1 may be substantially determined by the tapered angle of the drill for the large bore 24a. The WDM filter 20 may be set in the preset angle against the axis Z1 by sticking it on the tapered surface 24e of the joint bore 24c without any special process to form the structure for the WDM filter 20.

The body 24 provides, as described previously, the opening 24d through which the light passes. The opening 24d has a smaller diameter than that of the small bore 24b, and is offset in a center Z2 thereof from the axis Z1. That is, one edge of the opening 24d smoothly extends from an edge of the small bore 24c in a side where the cut filter 22 is set, while the other end of the opening 24d forms a step 24f with respect to the surface of the small bore 24b.

The reason why the two axes, Z2 and Z1 are offset is that the light coming from the TOSA 12 makes an angle to the axis to prevent stray light, which is emitted from the LD in the TOSA 12 and reflected by the surface of the lens 12a, from returning to the LD again to cause an optical noise. Thus, two axes, Z2 and Z1 are offset in order to couple the light coming from the TOSA 12 with a direction inclined to the axis Z1 with the optical fiber efficiently. The WDM filter 20 is to be fixed to the tapered slope 24e such that the edge thereof extends within the small bore 24b to cover the axis Z2.

The body also provides another bore 24g extending from the side thereof to the small bore 24b. Within the side bore 24g is implemented with the ROSA 14 and the cut filter 22 so as to shut the side bore 24g in a side of the small bore 24b. Specifically, the side bore 24g provides a plurality of bores whose diameters sequentially become smaller. The cut filter 22 is set at a step formed by two bores continuous to each other.

Figure 5:
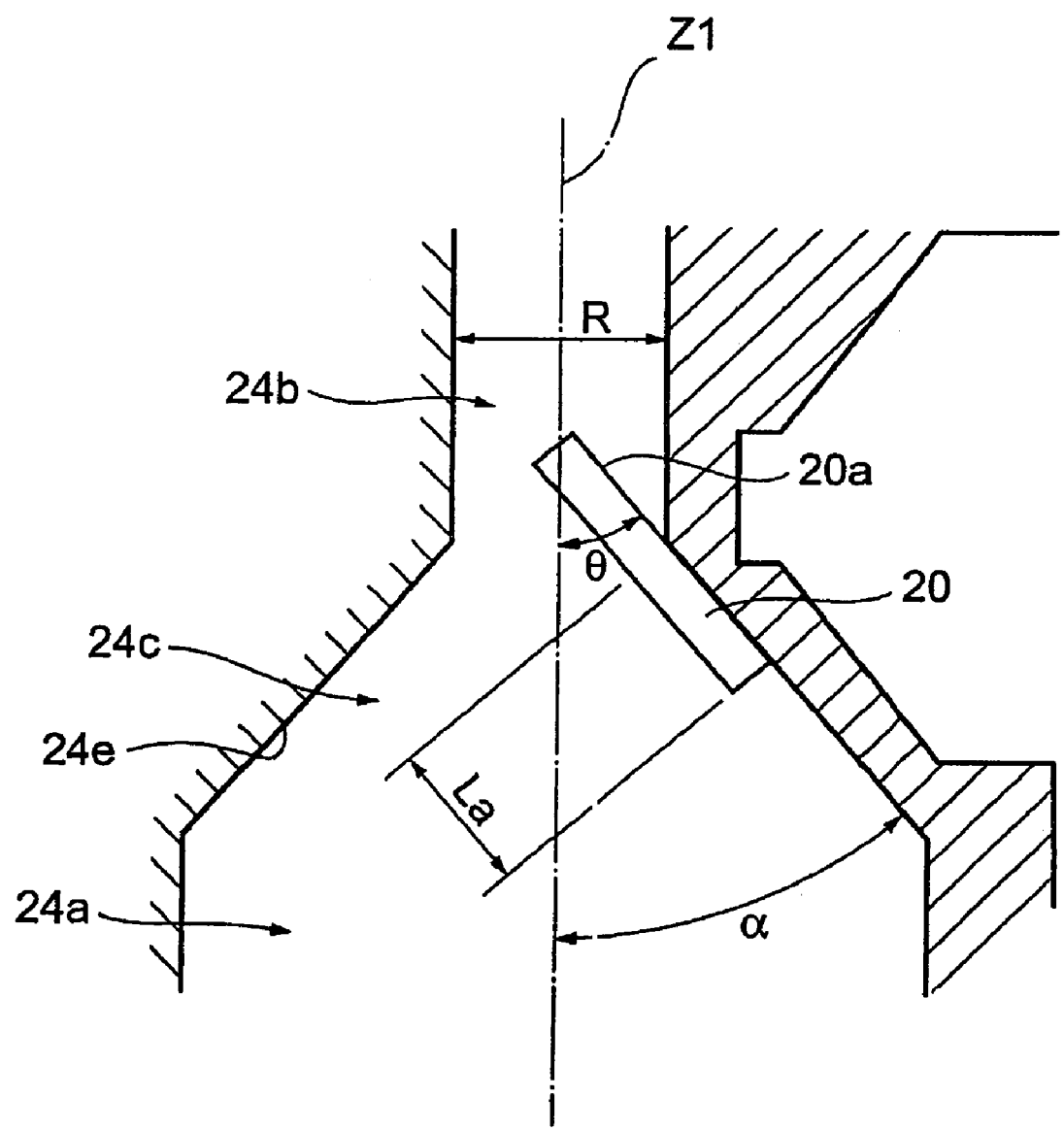
FIG. 5 magnifies the geometrical relation of the WDM filter with to the inner bores of the WDM unit.
Figure 6A:
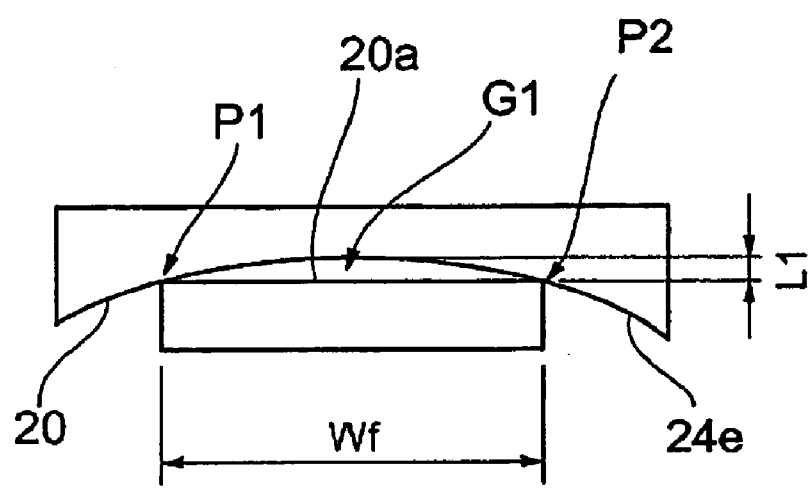
FIG. 6A schematically describes the geometrical relation between the WDM filter and the tapered surface of the joint bore at the boundary between the joint bore and the small bore, and FIG. 6B schematically describes the geometrical relation at the edge of the WDM filter.

Next will describe the WDM filter 20 attached to the tapered surface of joint bore 24c. FIG. 5 is a cross section magnifying a portion of the body 24 and the WDM filter 20 attached thereto, and FIGS. 6A and 6B describe geometrical relations between the WDM filter 20 and the tapered surface 24e; specifically, FIG. 6A illustrates a relation at the boundary between the tapered surface 24e and the small bore 24b, while, FIG. 6B illustrates a relation at the edge of the WDM filter 20.

Because the joint bore 24c is formed by drilling, its horizontal cross section becomes a circular with a smaller curvature at the boundary for the small bore 24b compared with a curvature at the position corresponding to the edge of the WDM filter 20. On the other hand, the WDM filter 20 has a slab shape, a rectangular plane shape. Accordingly, as illustrated in FIG. 6A, the WDM filter 20 comes in contact with the tapered surface at two points, P1 and P2, so as to form a gap G1 in a center portion thereof at the boundary between the joint bore 24c and the small bore 24b. A diameter of the small bore 24b and the width Ef of the WDM filter 20 may determine the size L1 of the gap G1. In the present embodiment, because the diameter of the small bore 24b is 1.6 mm, while, the width Ef of the WDM filter 20 is 0.85 mm, the size L1 of the gap G1 becomes about 70 μm.

Figure 6B:
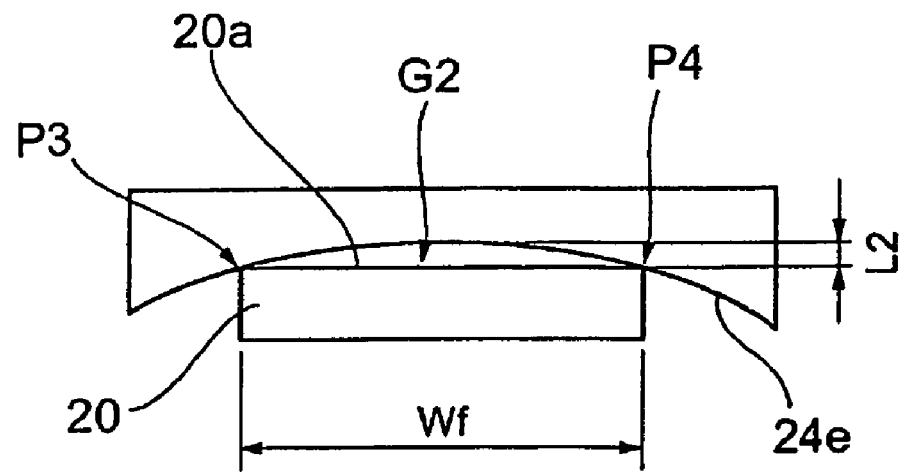

For the geometrical relation at the edge of the WDM filter 20, which is illustrated in FIG. 6B, the inner diameter of the joint bore 24c becomes larger compared to the edge at the side of the small bore 24b. The WDM filter 20 comes in contact with the tapered surface at respective edges, P3 and P4, so as to from another gap G2. Thus, the WDM filter 20 may come in contact with the tapered surface 24e of the joint bore 24c by their four corners, P1 to P4, as long as it is not in a twisted position with respect to the axis Z1 of the bores, 24a to 24c.

Figure 7A:
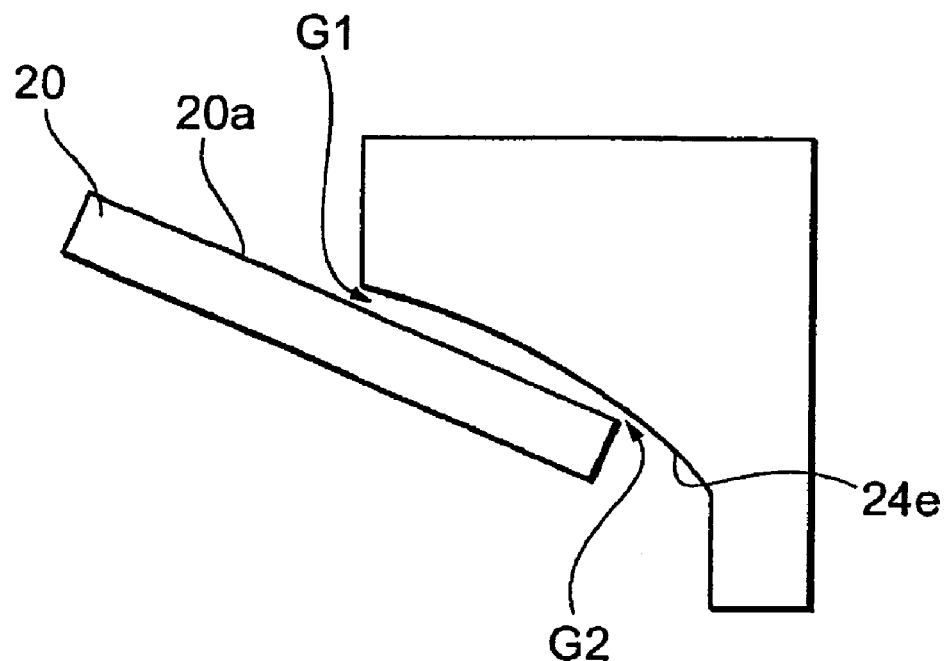
FIG. 7A schematically describes the geometrical relation between the WDM filter and the tapered surface of the joint bore at the center of the WDM filter, and FIG. 7B schematically describes the geometrical relation at the longitudinal edge of the WDM filter.
Figure 7B:
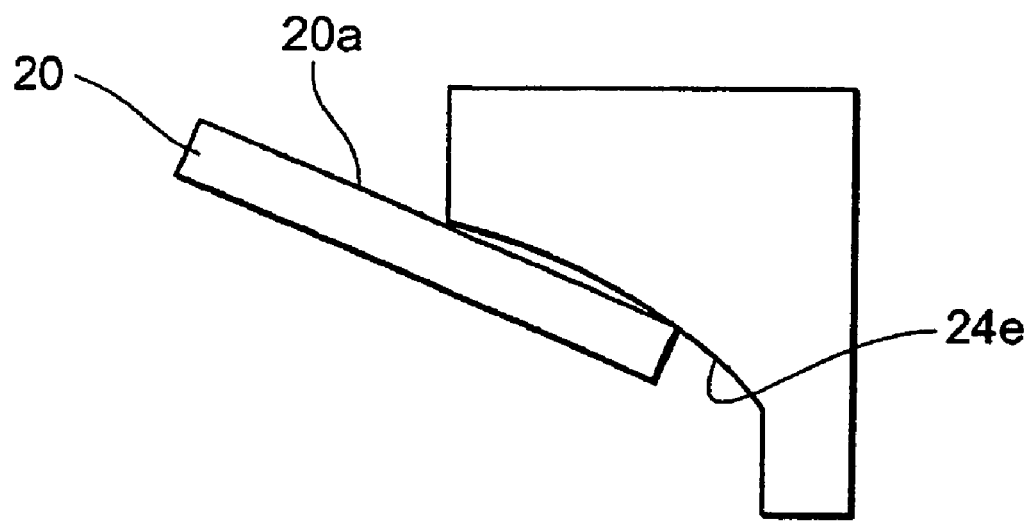

FIGS. 7A and 7B are cross sections taken along planes in parallel to the axis Z1. FIG. 7A is the cross section at the center of the WDM filter 20, while, FIG. 7B is the cross section along the edge thereof. As shown in FIGS. 7A and 7B, the tapered inner surface 24e of the joint bore 24c appears in a concaved surface even in a surface in parallel to the axis Z1. That is, reflecting the tip shape of the drill for forming the large bore 24a, the tapered surface 24e shows a concave cross section. Accordingly, the WDM filter 20 along the center thereof forms gaps, G1 and G2, with respect to the tapered surface 24e, whose magnitudes range from 50 to 100 μm.

On the other hand, as illustrated in FIG. 7B, the WDM filter 20 along the edge thereof makes another gap with a size of about 5 μm, and the corners of the WDM filter 20 at the edges come in contact with the tapered surface. As it will be explained later in this document, the WDM filter 20 is attached with the tapered surface 24e with an adhesive 32. This adhesive 32 may fill the gap of about 5 μm. Thus, the WDM filter 20 may be stuck with the body 24 without causing any voids in the adhesive 32.

Next, the positional accuracy of the WDM filter 20 thus stuck with the tapered surface 24e of the joint bore 24c will be described. Referring again to FIG. 5, assuming that parameters α, R, Ef, and La are a tip angle of the drill, a diameter of the small bore 24b, a width of the WDM filter 20, and an overlapped length of the WDM filter 20 with the tapered surface 24e, which corresponds to an area applied with the adhesive 32, respectively, the angle θ0 of the WDM filter 20 against the axis Z1 of the WDM unit 16 and its dispersion Δθ becomes;

$$\Delta\theta/\theta_0 \sim A_1 \cdot \Delta\alpha/\alpha + A_2 \cdot \Delta R/R + A_3 \cdot \Delta Ef/Ef + A_4 \cdot \Delta La/La.$$

When we form the large bore 24a and the joint bore 24c by using a practical drill, the angle α could not be definitely decided as mentioned above because of the blade shape of the drill. However, it may be applicable to regard the angle α to be the angle between the line connecting both ends of the joint bore 24c and the axis Z1. Coefficients, A1 to A4, appeared in the equation may be theoretically calculated from the practical dimensions of respective elements. Elements with the symbol "Δ" denote scatterings of respective parameters and θ0 is a target angle for the WDM filter 20.

Figure 8:
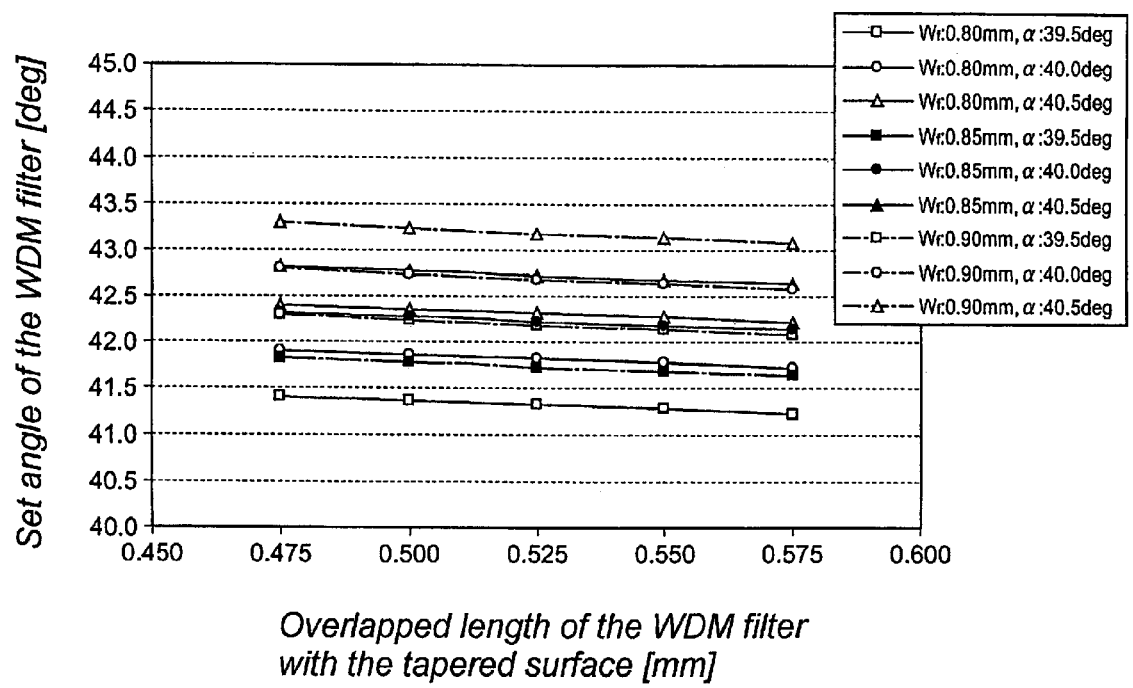
FIG. 8 shows calculated results of the set angle of the WDM filter with respect to the overlapped length between the WDM filter and the tapered surface, where the calculation takes the variations of the width of the WDM filter and the angle of the tapered surface into account.

FIG. 8 shows the calculated results of the set angle of the WDM filter 20 using the parameters, α, R, Ef, and La including tolerances thereof, in which a relation between the overlapped length La of the WDM filter 20, which is equivalent to a length where an adhesive 32 is applied, and the set angle θ is shown by varying the width Ef and the tip angle α as the parameters. Specifically, the calculation above assumes the tip angle α, which widely contributes to the scattering of the set angle θ among the parameters described above, to be 39±0.5° and the width Ef of the WDM filter 20 to be 0.85±0.05 mm. These two parameters, α and Ef, are intrinsically appeared in the WDM filter 20 or in the WDM unit 16 and are unable to adjust them during assembling. The horizontal axis in FIG. 8 corresponds to the overlapped length La, which is adjustable during assembling, ranging from 0.475 to 0.575 mm. That is, FIG. 8 evaluates the variation of the set angle θ of the WDM filter 20 in a range of the overlapped length La of 0.525±0.05 mm based on the parameters taking their tolerances mentioned above. Taking the optical coupling of the pig-tail unit 18 with the TOSA 12 and the ROSA 14, especially, the optical coupling with the ROSA 14; the set angle θ of the WDM filter 20 is necessary to be within 42.2±1.5°. The results shown in FIG. 8 converge within ±1.1°, which fully satisfy the required condition for the set angle θ above described.

Next, a method to assemble the BOSA 10 according to an embodiment of the present invention will be described. The method achieves the variation of the overlapped length La mentioned above within a range of ±50 μm.

Figure 9:
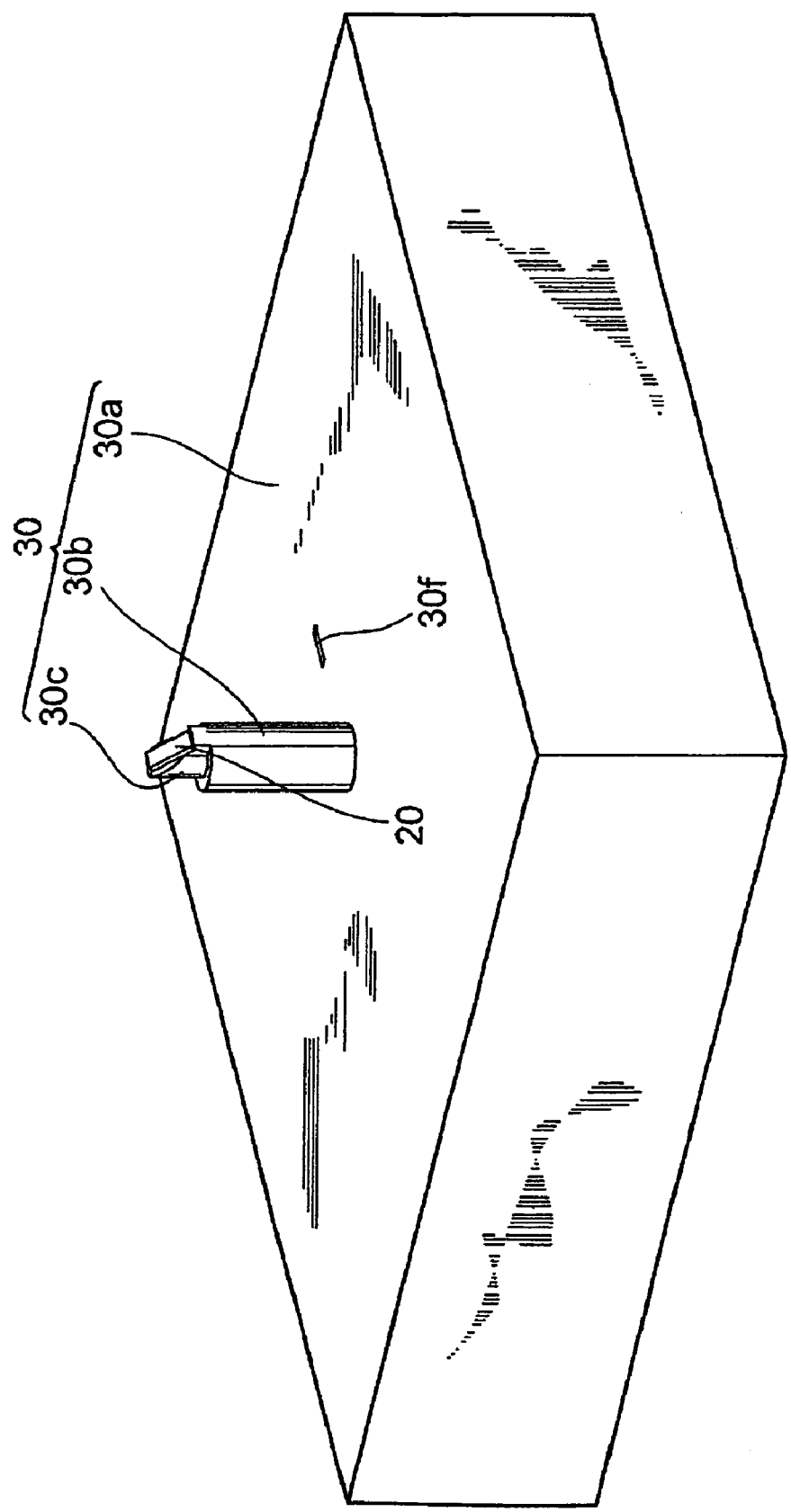
FIG. 9 shows a tool for assembling the WDM filter with the body of the WDM unit.
Figure 10:
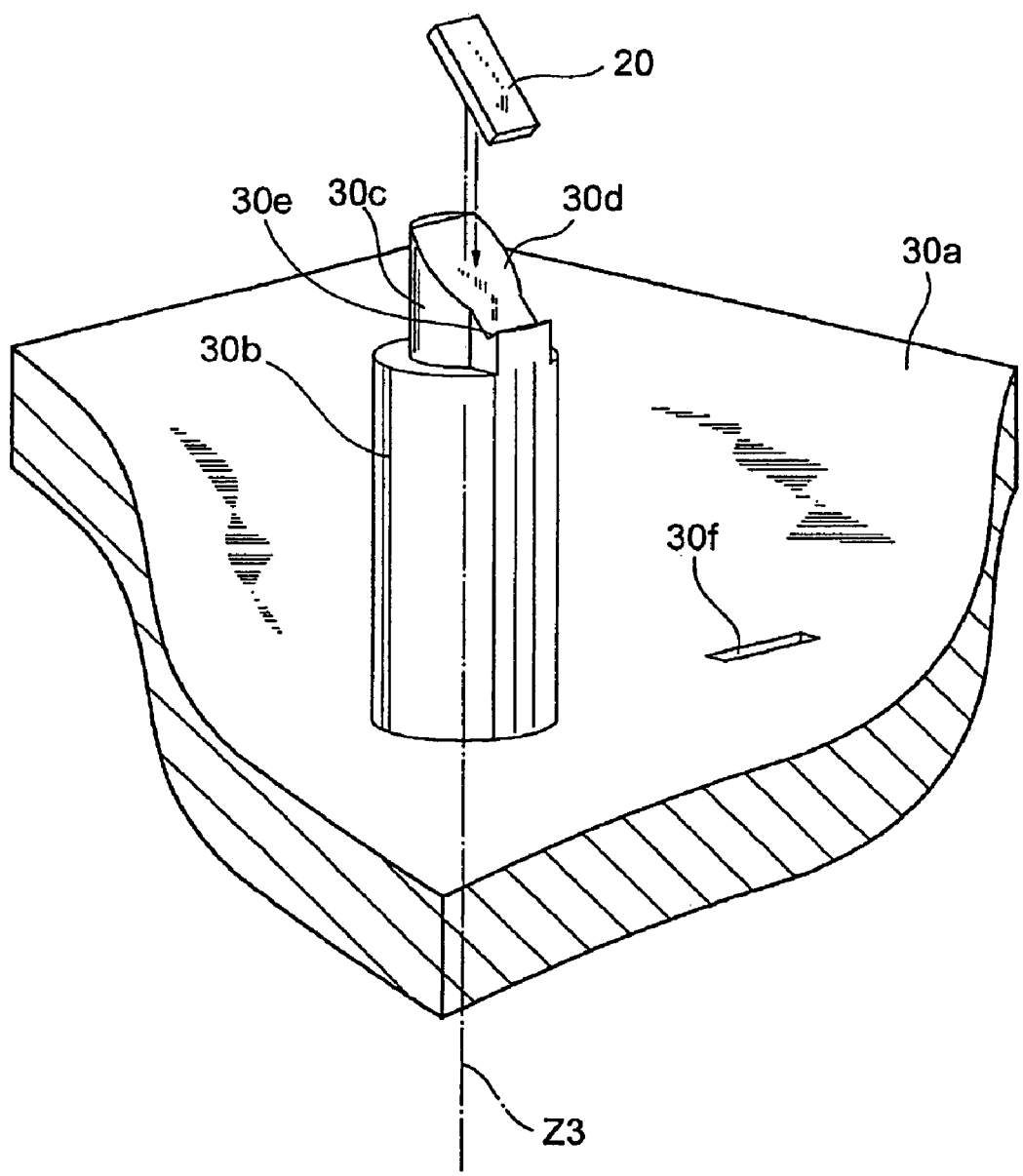
FIG. 10 illustrates a process to set the WDM filter on the upper cylinder of the assembling tool.

First, the process prepares the body 24 which is processed by the two-step drilling to form the small bore 24b, the large bore 24a, the joint bore 24c and the side bore 24g. Concurrently with the preparation of the body 24, or after the preparation thereof, the WDM filter 20 is set on a tool 30, as illustrated in FIGS. 9 and 10. FIG. 9 is a perspective view of the tool 30, while, FIG. 10 illustrates a process for the WDM filter 20 to be set on the tool 30. The tool 30 comprises the base 30a, the pillar 30b, and the top cylinder 30c.

The base 30a has a slab shape on which the body 24 of the WDM unit 16 is able to slide. On the base 30a is provided with the alignment marker 30f to adjust the rotational angle of the body 24, which is described later. The pillar 30b has an axis Z3 extending to a direction normal to the base 30 and has a diameter thereof larger than that of the small bore 24b but smaller than that of the large bore 24a.

The top cylinder 30c provides a slant surface 30d whose angle with respect to the axis Z3 corresponds to the angle of the tapered surface 24e with respect to the axis Z1. The top cylinder 30c also provides a contact surface 30e that makes a right angle to the slant surface 30d. In the process according to the present embodiment, the WDM filter 20 is set on this slant surface 30d. A width of the contact surface 30e is substantially equal to the width of the WDM filter 20, which aligns the WDM filter 20 with the tool 30.

Figure 11:
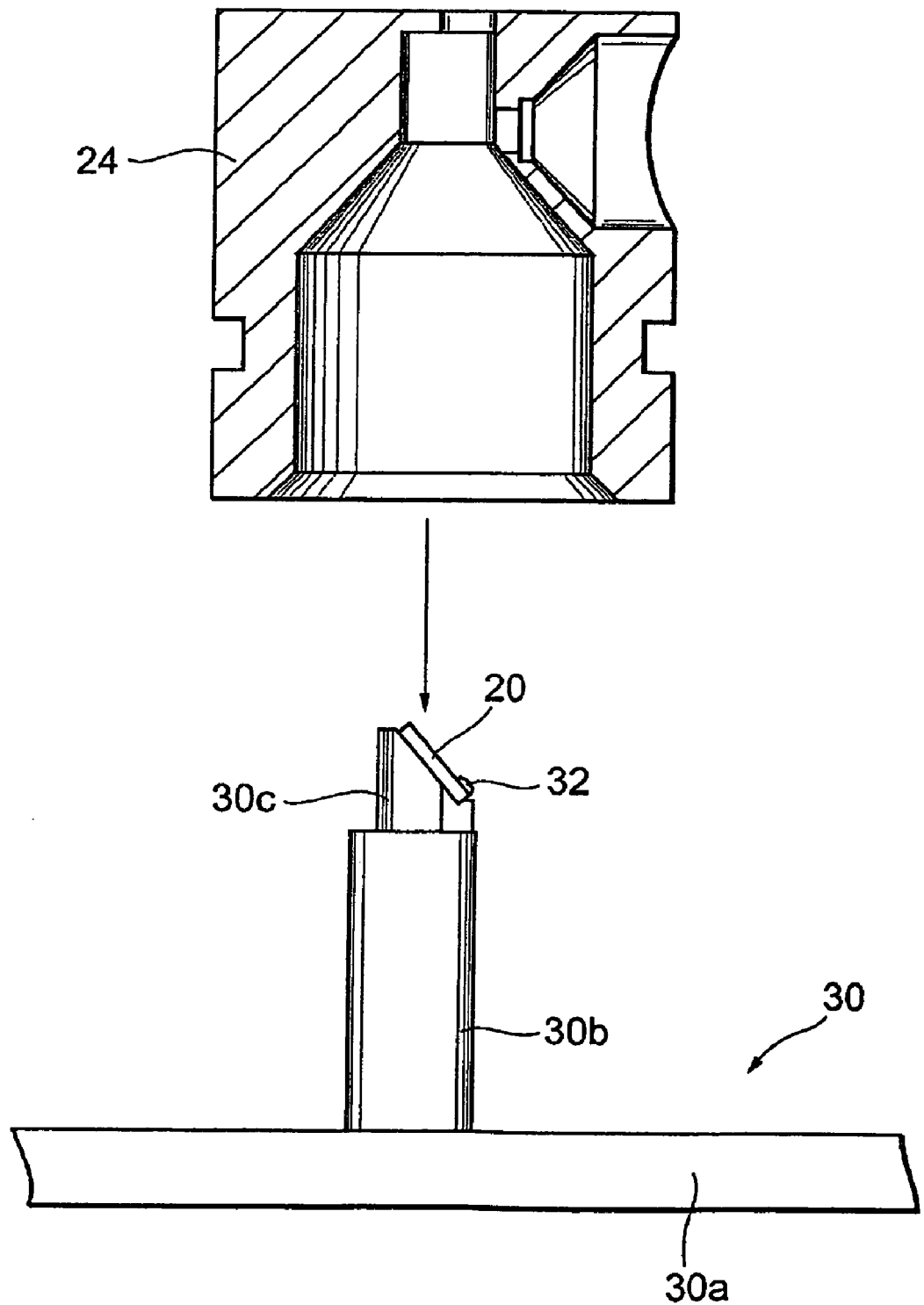
FIG. 11 illustrates a process to set the body of the WDM unit on the assembling tool.
Figure 12:
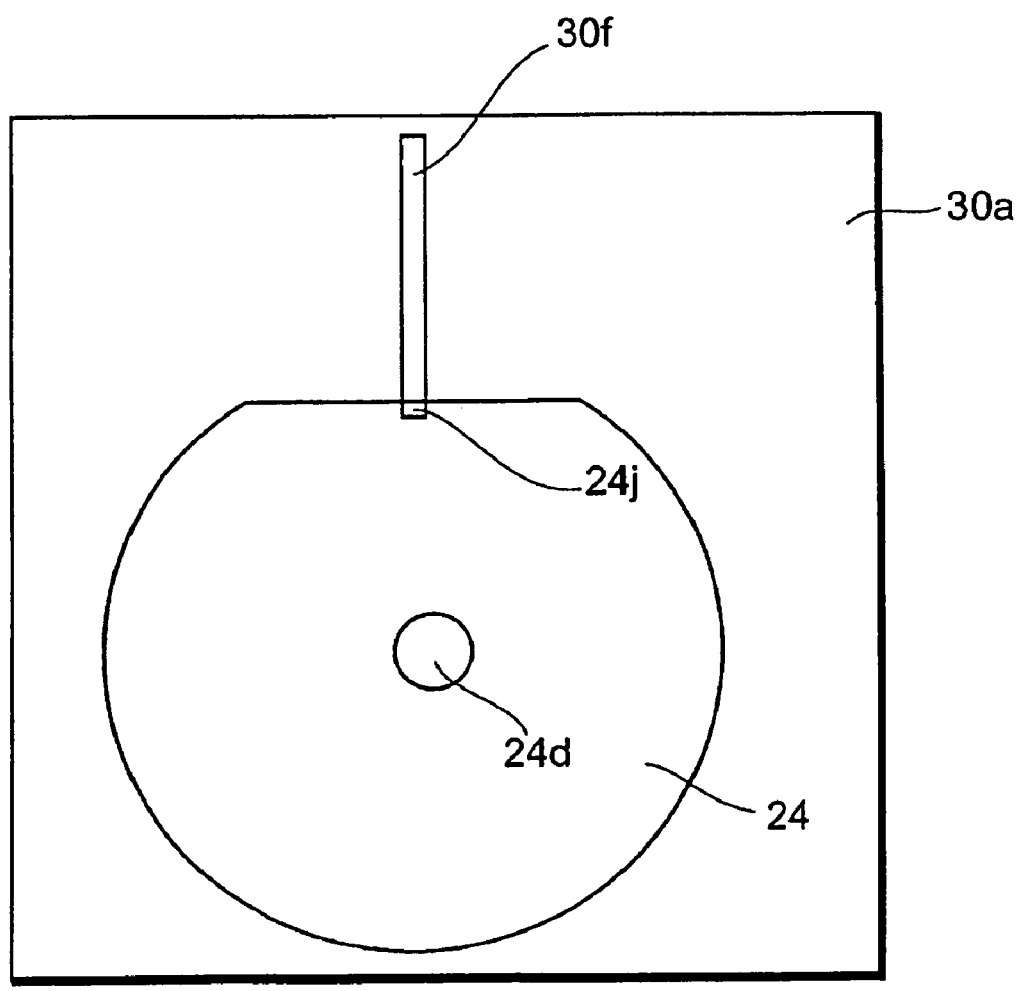
FIG. 12 illustrates a process to align rotationally the body of the WDM unit with respect to the assembling tool.

The body 20 of the WDM unit 16 is put down so as to cover the cylinder 30b and the top cylinder 30c from the top thereof, as illustrated in FIG. 11, after applying the adhesive 32 in edge portions of the WDM filter 20. Subsequently, the WDM filter 20 may be aligned with the body 24. As illustrate in FIG. 12, the body 24 provides a marker 24j in the front surface thereof. The positional relation of the marker 24j with respect to the alignment marker 30f on the base 30 is that, when the former maker 24j is aligned with the latter marker, the WDM filter 20 on the tool 30 is aligned with the base 24 without forming a twisted relation. Rotating the body 24 on the base 30a so as to align the marker 24j with the other marker 30f on the base 30a, the WDM filter 20 is rotationally aligned with the body 24.

Figure 13:
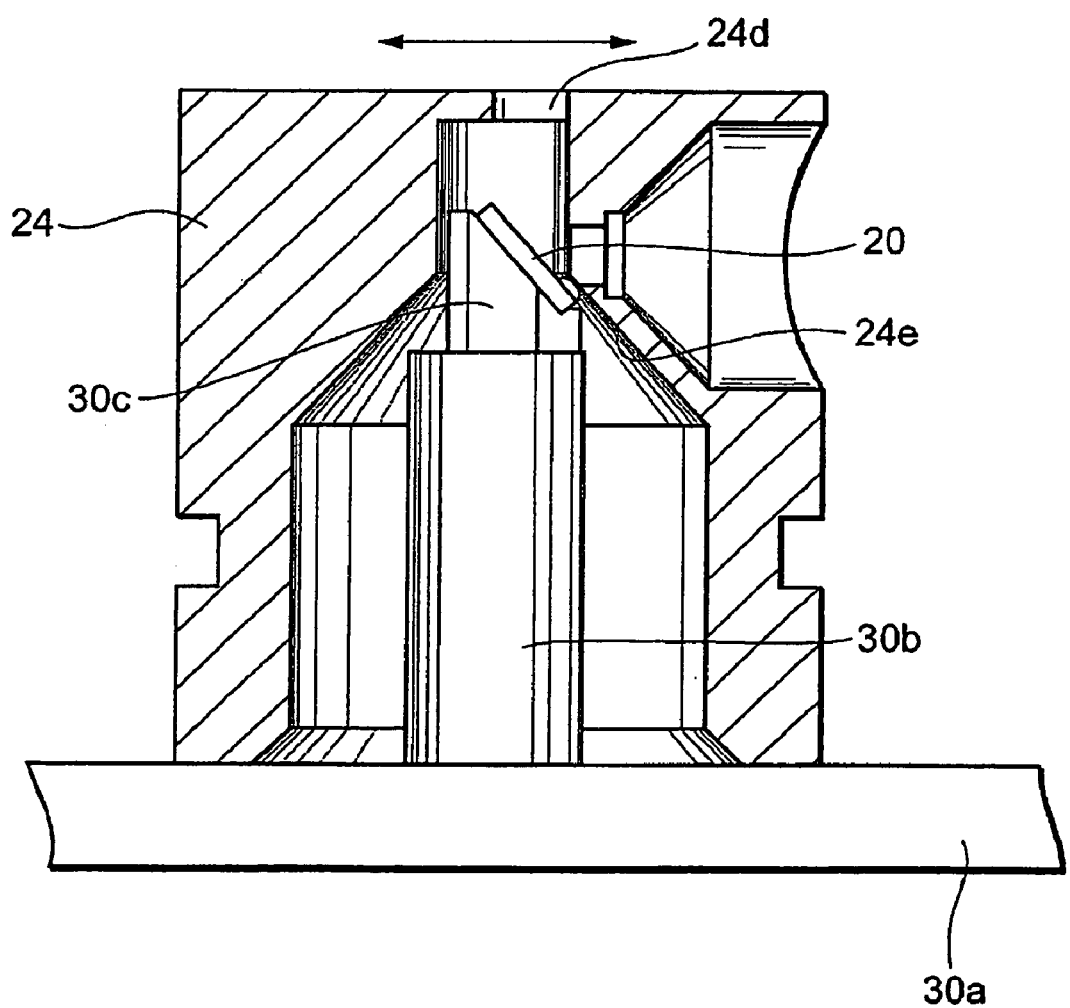
FIG. 13 illustrates a process to align horizontally the body of the WDM unit with respect to the assembling tool.

FIG. 13 illustrates a process to align the WDM filter 20 with the tapered surface 24e of the body 20. After the rotational alignment between the tool 30 and the body 24, the WDM filter 20 is aligned with the tapered surface 24e by the parallel displacement of the body 24 as the position of the WDM filter 20 is visually inspected from the opening 24d. As shown in FIG. 3, although it is a drawing viewed from the bottom of the body 24, the large and small bores, 24a and 24b, and the joint bore 24c disappear when it is viewed from the top. Accordingly, the position of the WDM filter 20 may be determined by aligning the upper edge 20b thereof with an edge of the opening 24d, which may realize the variation of the overlapped length La of the WDM filter 20 with the tapered surface 24e within ±50 μm determined by the theoretical calculation above.

Moreover, it is preferable that a difference between the diameters of the top cylinder 31b and that of the small bore 24b should be secured within a range to enable the alignment procedure mentioned above. Specifically, a difference of the diameters of about 0.1 mm may be enough for the alignment of the WDM filter 20.

Figure 14:
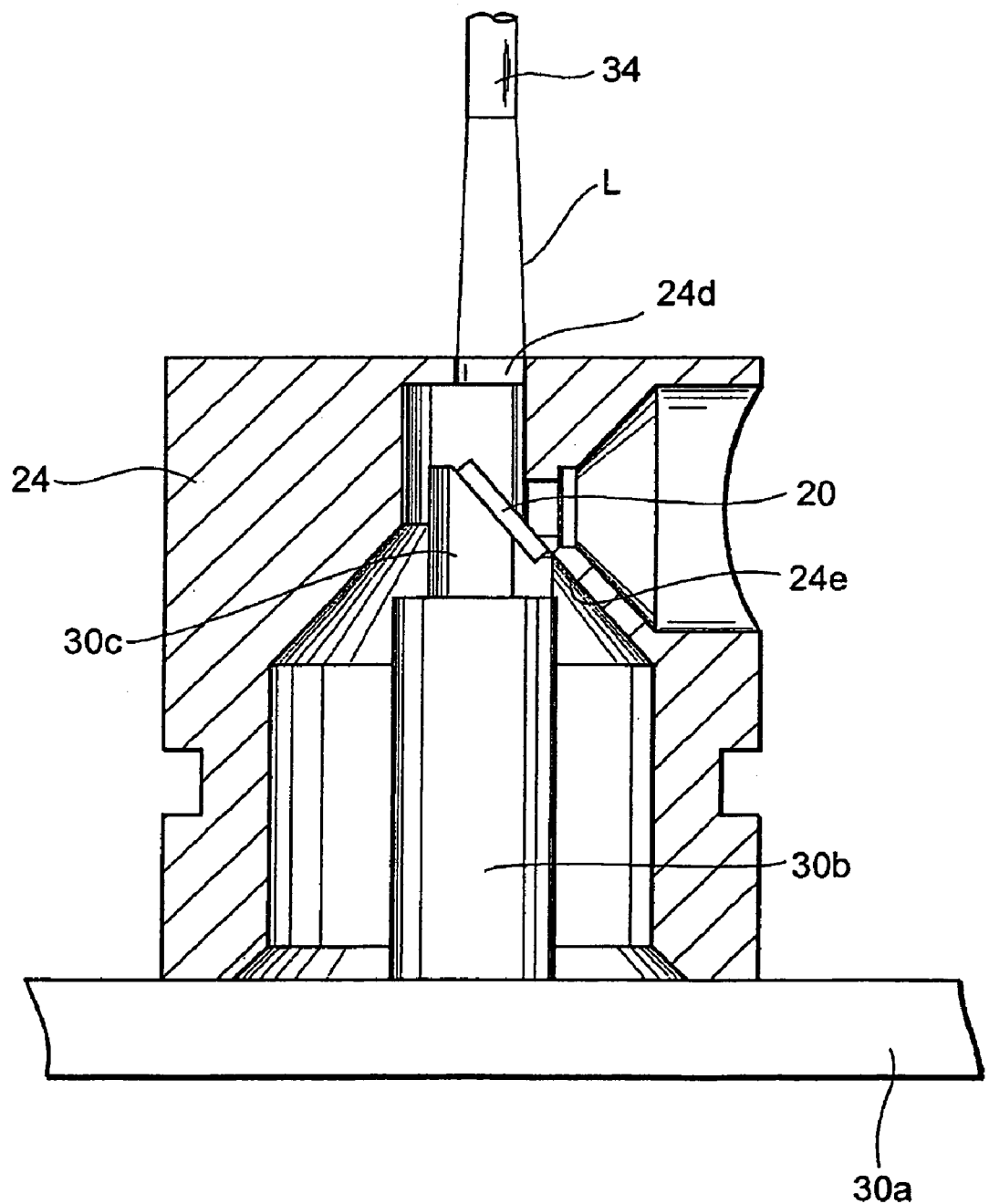
FIG. 14 illustrates a process to irradiate the ultraviolet ray from the opening to harden the adhesive applied between the WDM filter and the tapered surface of the joint bore.
Figure 15:
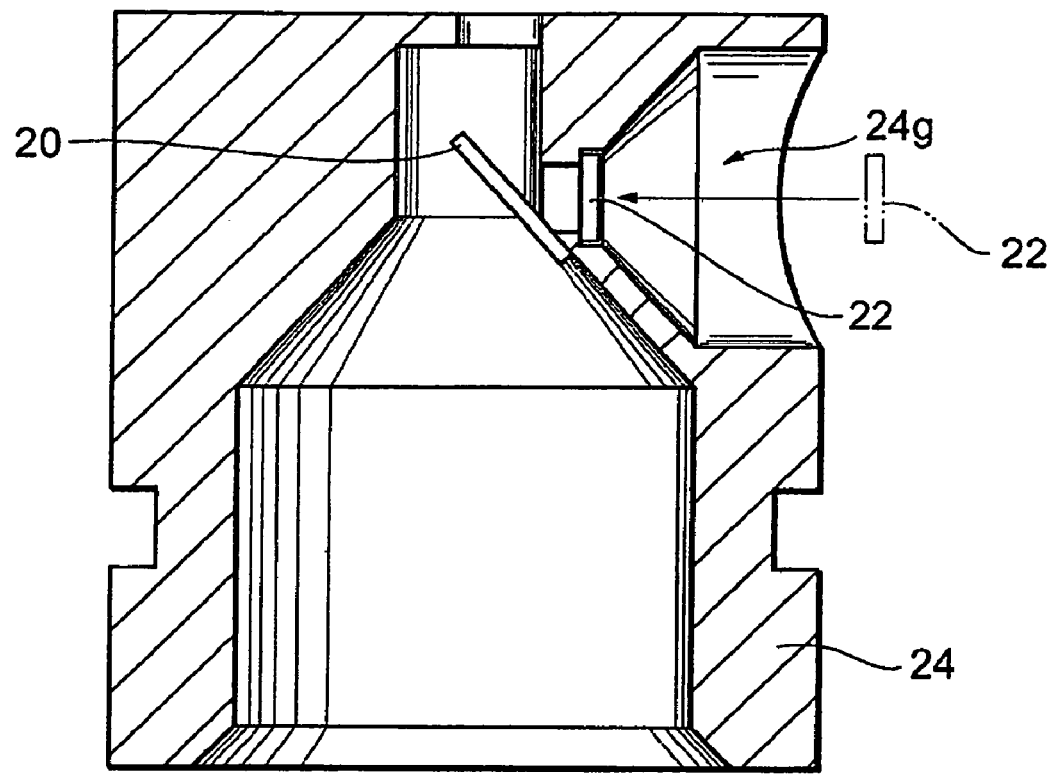
FIG. 15 illustrates a process to set the cut filter on the side bore.

After the WDM filter 20 is glued to the tapered surface 24e, the adhesive 32 is solidified by irradiating the ultraviolet ray from the opening 24d, as shown in FIG. 14. An adhesive of an ultraviolet curable type with a thermo-setting characteristic may enhance the bond strength. Subsequently, the cut-filter 22 is set on a position in the side bore 24g with a similar adhesive mentioned above, as shown in FIG. 15, which omits the WDM filter 20. Finally, a thermo-process at 120° C. may harden the adhesive and the assembly of the WDM unit 16 with the WDM filter 20 is completed. The first and second optical devices, 12 and 14, are set in the large bore 24a and the side bore 24g, respectively, to complete the assembly of the BOSA 10.

(Modification)

Figure 16:
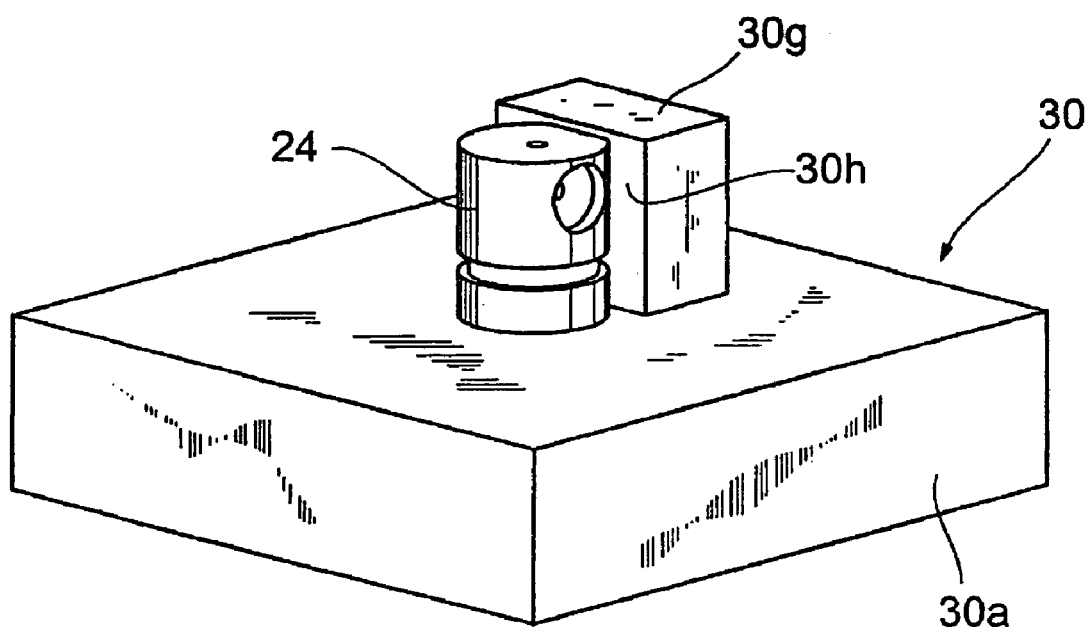
FIG. 16 is a perspective view of the body of the WDM unit, which has a plane side surface as a modified outer shape, aligned with the WDM filter by a modified assembling tool by abutting the plane side surface against the side of the block of the assembling tool.

One modification of the process to form the WDM unit 16 will be described. For the rotational alignment of the WDM filter 20 with respect to the body 24, a method shown in FIG. 16 may be carried out in place of the procedure using the markers, 24j and 30f. That is, the body 24 provides a plane surface 24k in a side thereof so as to be in parallel to the longitudinal axis of the WDM filter 20, while, the tool 30 provides a block 30g with a plane side surface 30h on the base 30a. Abutting the side surface 24k of the body 24 against the surface 30h of the tool 30, the longitudinal axis may be aligned with the body 24.

Second Embodiment

Figure 17:
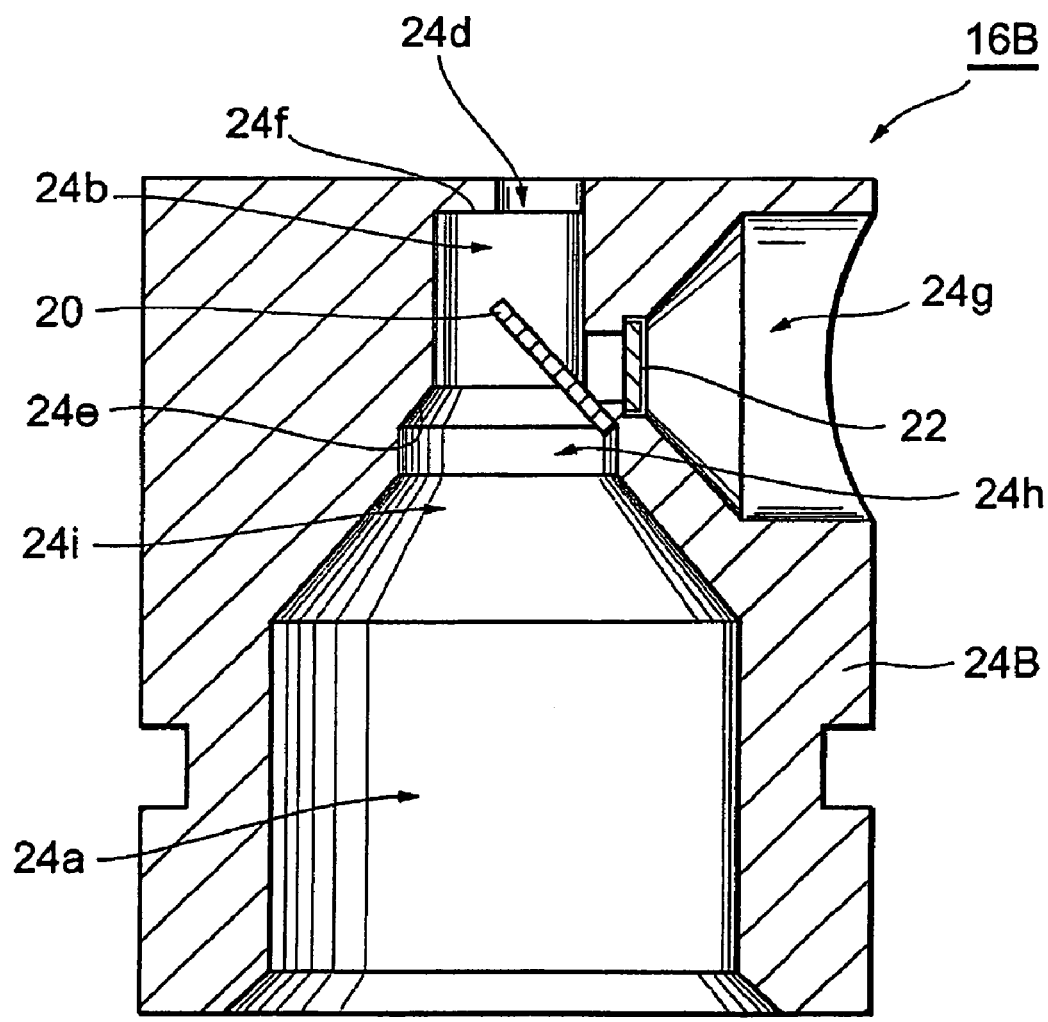
FIG. 17 is a cross section of the other WDM unit with the WDM filter according to the second embodiment of the invention, which provides the intermediate bore and first and second tapered surfaces.

The embodiment explained above provides the simple joint bore 24c, that is, the joint bore 24c smoothly connects the large bore 24a to the small bore 24b with a single slope. FIG. 17 illustrates another WDM unit 16B that provides the body 24B with a modified joint bore that provides two tapered slope and a step between the tapered slopes. Referring to FIG. 17, the WDM unit 16B provides, similar to the former embodiment, a large bore 24a, a small bore 24b and an opening 24d. The WDM unit 16B further provides an intermediate bore 24h continuous to the joint bore 24c, and has a diameter equal to a diameter of the joint bore 24c at the bottom end thereof and smaller than the diameter of the large bore 24a. Between the large bore 24a and the intermediate bore 24h is formed with the second joint bore 24i, while, between the small bore 24b and the intermediate bore 24h is formed with the first joint bore 24c. These bores are arranged so as to align their axis Z1 with each other. The opening 24d is offset from the axis Z1, which is similar to the first embodiment.

The WDM filter 20 is arranged in the first tapered surface 24e so as to abut the edge thereof against the boundary between the first tapered surface 24e and the intermediate bore 24h. Thus, the body 24B of this embodiment may automatically determine the overlapped length La of the WDM filter 20 with the tapered surface 24e, which enables to simplify the manufacturing process of the WDM unit 16B.

While the preferred embodiments of the present invention have been described in detail above, many changes to those embodiments may be made without departing from the true scope and teachings of the present invention. The present invention, therefore, is limited only as claimed below and the equivalents thereof.

What is claimed is:

1. An optical module that optically couples with a single optical fiber, comprising:
   a first optical device configured to process first light with a first wavelength;
   a second optical device configured to process second light with a second wavelength different from said first wavelength;
   a body configured to secure said first optical device and said second optical device, and to install a wavelength division multiplexing filter that transmits said first light and reflects said second light, said body providing a bore to transmit said first light and said second light; and
   an opening connected to said bore,
   wherein said bore defines a tapered and arched surface internal to said bore, and said wavelength division multiplexing filter is secured to said tapered and arched surface inside said bore, and
   wherein said single optical fiber is optically coupled with said first optical device, said second optical device and said wavelength division multiplexing filter through said opening.

2. The optical module according to claim 1,
   wherein said bore includes a large bore, a small bore and a joint bore, said large bore having a diameter larger than a diameter of said small bore, said joint bore connecting said large bore with said small bore and forming said tapered and arched surface, and
   wherein said large bore, said small bore and said joint bore are co-axially formed to have a common axis.

3. The optical module according to claim 2,
   wherein said body further provides a side bore in a position facing said wavelength division multiplexing filter, said side bore being connected with said joint bore, and
   wherein said large bore secures said first optical device and said side bore secures said second optical device.

4. The optical module according to claim 1,
   wherein said opening provides a center axis offset from a center axis of said bore.

5. The optical module according to claim 1,
   wherein said bore includes a small bore with a first diameter, an intermediate bore with a second diameter, and a large bore with a third diameter, a first joint bore connecting said small bore with said intermediate bore and a second joint bore connecting said intermediate bore with said large bore, said first diameter is smaller than said second diameter that is smaller than said third diameter, and
   wherein said first joint bore forms said tapered and arched surface to secure said wavelength division multiplexing filter.

6. The optical module according to claim 5,
   wherein said wavelength division multiplexing filter has an edge abutting against a boundary between said first joint bore and said intermediate bore.

7. The optical module according to claim 1,
   wherein said wavelength division multiplexing filter is fixed to said tapered and arched surface in a condition that only four points including a pair of corners come in contact with said tapered and arched surface to leave an arched gap in a center portion of said wavelength division multiplexing filter.

8. A tri-plexer optical module optically coupled with a single optical fiber, comprising:
   a first optical device implemented with a laser diode and a first photodiode, said laser diode emitting first light with a first wavelength, said first photodiode receiving second light with a second wavelength different from said first wavelength;
   a second optical device implemented with a second photodiode configured to receive third light with a third wavelength different from said first and second wavelengths;
   a body configured to secure said first optical device and said second optical device, and to install a wavelength division multiplexing filter that transmits said first light and said second light but reflects said third light, said body providing a bore with a tapered and arched surface internal to said bore wherein said wavelength division multiplexing filter is secured to the tapered and arched surface inside said bore; and
   an opening connected to said bore,
   wherein said single optical fiber is optically coupled with said first optical device, said second optical device and said wavelength division multiplexing filter through said opening.

9. The tri-plexer optical module according to claim 8,
   wherein said bore includes a small bore, a large bore with a diameter greater than a diameter of said small bore and a joint bore connecting said small bore with said large bore,
   wherein said joint bore provides said tapered and arched surface, and
   wherein said small bore, said large bore and said joint bore are co-axially formed to have a common axis.

10. The tri-plexer optical module according to claim 9,
    wherein said body further provides a side bore connected with said joint bore, said side bore receiving said second optical device and a cut filter to cut said first light and said second light but to transmit said third light, wherein said second optical device is optically coupled with said single fiber through said cut filter and said wavelength division multiplexing filter.

11. The tri-plexer optical module according to claim 8, wherein said wavelength division multiplexing filter is fixed to said tapered and arched surface in a condition that only four points including a pair of corners come in contact with said tapered surface to leave an arched gap in a center portion of said wavelength division multiplexing filter.

12. A method for assembling an optical module that provides a body configured to secure at least two optical devices optically coupled with a single optical fiber, said at least two optical devices each processing light with different wavelengths and to install a wavelength division multiplexing filter to divide or to multiplex said light, said method comprising steps of:

(a) forming a bore and an opening in said body by drilling so as to form a tapered and arched surface inside said bore, said opening being continuous with said bore;

(b) preparing an assembling tool that provides a pillar and a slant surface in a top of said pillar;

(c) setting said wavelength division multiplexing filter on said slant surface of said pillar, said wavelength division multiplexing filter being applied with an adhesive;

(d) mating said body with said assembling tool such that said bore of said body receives said pillar;

(e) aligning said body with said assembling tool; and (f) gluing said wavelength division multiplexing filter inside said bore on said tapered and arched surface, wherein only four points of said wavelength division multiplexing filter contact said tapered and arched surface.

13. The method according to claim 12, wherein said adhesive is a ultraviolet curable resin, and said step (f) includes a step for irradiating ultraviolet ray from said opening of said body.

14. The method according to claim 12, wherein said step (e) includes a rotational alignment and a translational alignment between said assembling tool and said body.

15. The method according to claim 14, wherein said translational alignment includes a step for aligning an edge of said wavelength division multiplexing filter with an edge of said opening by visually inspecting said wavelength division multiplexing filter.

16. The method according to claim 12, wherein said body includes a plane side surface and said assembling tool includes a block with a plane side surface, wherein said process (e) includes a step for abutting said plane side surface of said body against said plane side surface of said block of said assembling tool.

* * * * *